E. WOERNER.
COMMON CAM DRIVING DEVICE FOR ACTUATING THE PISTONS OF A PLURALITY OF PUMPS.
APPLICATION FILED SEPT. 2, 1919.
1,336,803.
Patented Apr. 13, 1920.
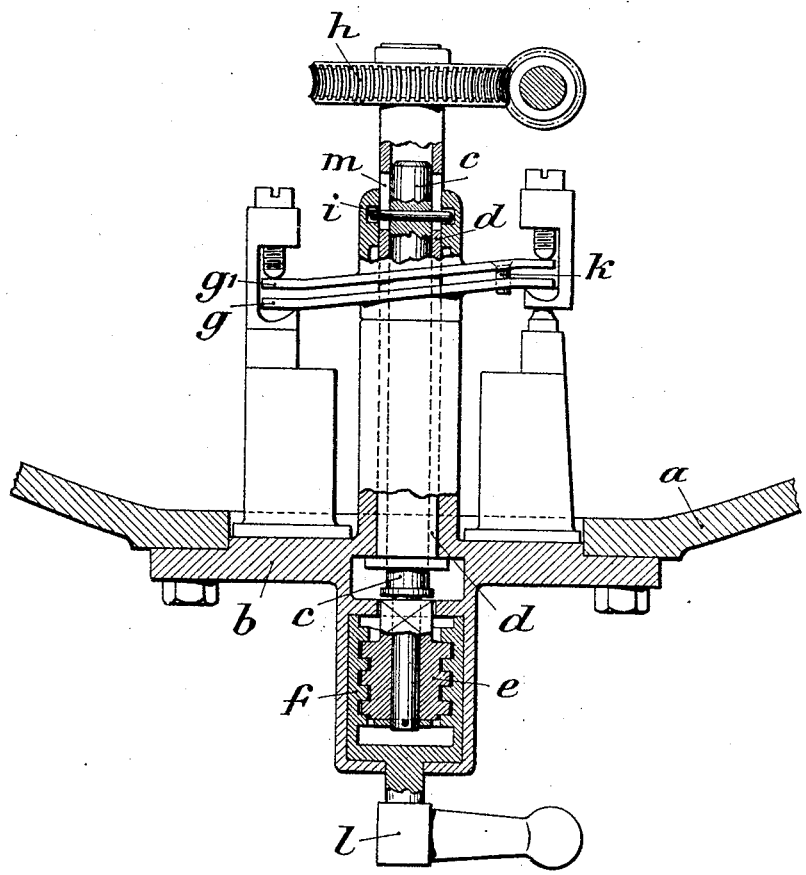
INVENTOR
Eugen Woerner
BY ATTORNEYS
Pennie, Davis, Marvin & Edmonds

UNITED STATES PATENT OFFICE.

EUGEN WOERNER, OF STUTTGART, GERMANY, ASSIGNOR TO THE FIRM OF ROBERT BOSCH AKTIENGESELLSCHAFT AT STUTTGART.

COMMON CAM-DRIVING DEVICE FOR ACTUATING THE PISTONS OF A PLURALITY OF PUMPS.

1,336,803.      Specification of Letters Patent.      Patented Apr. 13, 1920.

Application filed September 2, 1919. Serial No. 321,278.

*To all whom it may concern:*

Be it known that I, EUGEN WOERNER, engineer, a citizen of Germany, residing at and whose post-office address is Stuttgart, Militärstrasse 2ᴮ, Germany, have invented certain new and useful Improvements in Common Cam-Driving Devices for Actuating the Pistons of a Plurality of Pumps; and I do hereby declare the following to be a full, clear, and exact description of the invention, such as will enable others skilled in the art to which it appertains to make and use the same.

Through the Patent No. 1,147,910 it has become known that the magnitudes of the strokes of the pistons of a plurality of individual pumps, which are arranged in a circle around a driving shaft, may be altered simultaneously and during their working by shifting, in an axial direction of the driving shaft, the one half of a piston-actuating cam-disk that is divided in two halves, and whose plane of division runs at right angles to the length of the shaft. The shifting forward of the one half of the two-part cam disk is accomplished according to the said patent by the aid of a lever and rod gear that is in engagement with the one half of the cam disk and which, on the adjusting-lever being thrown over in the one direction or the other, carries the movable half of the cam disk along with it. The length of stroke of the pistons may, according to the said patent, be adjusted and fixed by means of a notched adjusting segment, each notch of which represents a certain length of stroke.

In a pump of the described type, that is used for lubricating purposes, which is not inclosed in a special casing and is not easily accessible, but which is arranged in an oil vessel that is closed on all sides and serves as the oil collecting chamber of a machine or the like, some means outside of the said chamber must be provided by which the stroke of the pistons may be adjusted at any moment, and this means must be made as simple as possible. It is also advantageous not to be limited to a fixed number of positions of adjustment such as the notches aforementioned, but to be able to adjust the stroke to any length or point within the total range of adjustment, because, even with small differences of stroke, the amount of oil shifted by lubricating pumps when running at high speeds varies quite considerably in a certain length of time.

The object of the present invention is to so improve the common driving device for actuating several lubricating pumps described and claimed in Patent 1,147,910 that it embodies all of the advantages set forth above. A feature of the new invention is that the varying of the distance between the two halves of the cam-disk is effected by shifting a shaft, that is coupled with the driving device, in the direction of its axis. The shaft is connected with the one half of the cam disk and the former is shifted by means of an adjusting handle arranged on the outside of the oil collecting chamber. One end of the shaft that is coupled to the driving device protrudes through the base-plate of machine, and onto this end a bush is slipped in which the shaft turns and on which there is a steep thread. This bush is capable of moving longitudinally in a guide hole in the base plate, but cannot be revolved. A nut with a female thread screwed onto the said threaded bush is connected to the adjusting handle outside of the oil collecting chamber and is turned with the aid of this handle. When the nut is thus turned, the threaded bush screws into or out of the nut and shifts the shaft that is connected to the one half of the cam-disk in the direction of its axis.

In the drawing a cross section of a pump equipped with a piston stroke adjusting device of the kind described above is shown.

The lubricating pump, which comprises a number of individual pumps arranged in a circle around the driving shaft, is fixed in a known manner without any special casing in an oil collecting chamber $a$. The pistons of the lubricating pump are actuated by a common cam-disk, which is divided in two halves $g$ and $g^1$, the plane of division between the two halves extending crosswise to the length of the shaft. The worm-wheel $h$, that forms a part of the mechanical driving device, has a hub which forms a hollow shaft $d$ that revolves freely in the body or frame of the pump and carries one half $g$ of the cam-disk. The other half $g^1$ of the cam-disk is slipped loosely onto the hollow shaft $d$ and coupled by a fixing pin $k$ to the other half $g$ of the cam-disk. In the hollow shaft $d$ or hub of the driving wheel a shaft $c$ is arranged so as to be capable of longitudinal, but not of rotary, movement therein. This shaft $c$ is furnished with a carrier pin $i$, that extends through slots $m$ in the hollow shaft $d$ and engages with the half $g^1$ of the disk in such manner that this latter may turn loosely about the shaft $c$, but can not be shifted in the direction of its longitudinal axis. Onto the end of the shaft $c$ that protrudes through the base plate $b$, a bush $e$ with a steep external thread is slipped. The shaft $c$ rotates in this bush, but the latter is prevented from turning by a guide-hole in the base plate. The steep thread of the bush $e$ engages with the screw in the nut $f$ that is rigidly connected to the adjusting handle $l$.

When the pump is working the shaft $c$ is forced to turn with the driving wheel $h$ by means of the hollow shaft or hub $d$ of the said wheel and by the carrier pin $i$. As the half $g$ of the cam-disk is secured to the hollow shaft, it also turns with it. The half $g$ of the cam-disk is coupled by the fixing pin $k$ to the other half $g^1$ of the cam-disk so that this also revolves. Now if the stroke of the pump-pistons is to be altered, the adjusting lever $l$, and thus the nut $f$ are turned so as to cause the threaded bush $e$ to screw into or out of the nut $f$ and thus shift the shaft $c$ in a longitudinal direction in the hollow shaft $d$; the half $g^1$ of the cam disk, that is coupled to the shaft $d$ by the pin $i$, being caused to participate in this movement so as to alter the distance between the halves $g$ and $g^1$ of the cam disk, in consequence of which the stroke of the pump-pistons is also altered.

The threaded bush $e$ must be prevented from turning with shaft $c$ during the working of the pump, because otherwise it would execute a screw movement in its nut.

I claim:

1. In combination with a common driving device for actuating the pistons of a plurality of individual pumps arranged around a driving shaft, an oil collecting chamber containing a piston-actuating cam-disk divided in two halves and having its plane of division extending at right angles to the length of the driving shaft, a cam-adjusting shaft for adjusting the distance between the halves of the cam-disk, and a handle outside of the oil collecting chamber for shifting the cam-adjusting shaft.

2. In combination with a common driving device for actuating the pistons of a plurality of individual pumps arranged around a driving shaft an oil collecting chamber containing a piston-actuating cam-disk divided in two halves and having its plane of division extending at right angles to the length of the driving shaft, a cam-adjusting shaft for adjusting the distance between the halves of the cam-disk, a base-plate attached to the said oil collecting chamber, one end of the said cam-adjusting shaft protruding through the said base-plate to the exterior of the oil collecting chamber, a bush having an external thread and pivotally mounted on the said protruding end of the cam-actuating shaft, a nut on the said external thread, and a handle connected to the said nut.

3. In combination with a common driving device for actuating the pistons of a plurality of individual pumps arranged around a driving shaft, an oil collecting chamber containing a piston-actuating cam-disk divided in two halves and having its plane of division extending at right angles to the length of the driving shaft, a cam-adjusting shaft connected to the one half of the said cam-disk and movable with the same in the direction of the longitudinal axis of the said driving shaft, and a handle outside of the oil collecting chamber for shifting the cam-adjusting shaft.

4. In combination with a common driving device for actuating the pistons of a plurality of individual pumps arranged around a driving shaft, an oil collecting chamber containing a hollow driving shaft, a piston-actuating cam-disk on the said driving shaft, said cam disk being divided in two halves and having its plane of division extending at right angles to the length of the driving shaft, a cam-adjusting shaft longitudinally movable in the said hollow driving shaft, a pin passing through the cam-adjusting shaft and through slots in the hollow shaft and engaging one half of the said cam-disk, this half being movable about the adjusting shaft but not in the direction of the longitudinal axis of the same, and a handle outside of the oil collecting chamber and connected to the said cam-adjusting shaft.

In testimony whereof I affix my signature in presence of two witnesses.

EUGEN WOERNER.

Witnesses:
ADOLF GEBHERT,
HERMANN SCHNEIDER.